(12) United States Patent
Fulton

(10) Patent No.: US 7,133,446 B1
(45) Date of Patent: Nov. 7, 2006

(54) PERFORMANCE INDICATOR FOR WIRELESS DIGITAL SIGNAL RECEPTION

(75) Inventor: Paul Fulton, Los Gatos, CA (US)

(73) Assignee: 3Com Corporation, Marlborough, MA (US)

( * ) Notice: Subject to any disclaimer, the term of this patent is extended or adjusted under 35 U.S.C. 154(b) by 742 days.

(21) Appl. No.: 09/693,679

(22) Filed: Oct. 19, 2000

(51) Int. Cl.
H04B 3/46 (2006.01)
H04B 7/216 (2006.01)
H04B 17/00 (2006.01)

(52) U.S. Cl. .................. 375/224; 370/342; 455/226

(58) Field of Classification Search ........... 375/224; 348/570; 700/94, 250, 257; 370/328, 330, 370/342; 371/40; 455/226
See application file for complete search history.

(56) References Cited

U.S. PATENT DOCUMENTS

| | | | | |
|---|---|---|---|---|
| 5,483,690 A | * | 1/1996 | Schroder | 455/226.1 |
| 5,574,509 A | * | 11/1996 | Citta et al. | 348/569 |
| 5,699,365 A | * | 12/1997 | Klayman et al. | 714/708 |
| 6,363,245 B1 | * | 3/2002 | Natori | 455/226.3 |
| 6,466,832 B1 | * | 10/2002 | Zuqert et al. | 700/94 |
| 6,522,299 B1 | * | 2/2003 | Beard et al. | 343/702 |
| 6,539,205 B1 | * | 3/2003 | Wan et al. | 370/465 |
| 6,545,643 B1 | * | 4/2003 | Sward et al. | 343/702 |
| 6,560,443 B1 | * | 5/2003 | Vaisanen et al. | 455/73 |
| 6,622,018 B1 | * | 9/2003 | Erekson | 455/420 |

FOREIGN PATENT DOCUMENTS

EP 0818923 A2 * 1/1998

OTHER PUBLICATIONS

Tidrow, Rob; Gagnon, Christopher; Windows 98 Installation & Configuration Handbook; Chap. 23; Que; Bk&CD Rom edition, May 1998.*
Dell Product Details: D-Link SYSTEMS DFE-550TX 10/100 Mb Dual Speed Ethernet PCI Network Interface Card.*
Dell Product Details: LINKSYS WPC11 Instant Wireless Network PC Card.*

* cited by examiner

Primary Examiner—Khai Tran
Assistant Examiner—Cicely Ware

(57) ABSTRACT

A performance indicator for wireless digital signal reception is disclosed. In particular, a method for indicating the reception quality of a wireless digital signal at an electronic device is disclosed. The method includes a series of steps, starting with a first step of receiving the wireless digital signal at the electronic device. In the next step, the wireless signal is demodulated. Then, an error rate associated with the digital data portion of the wireless signal is determined. In the next step, a quality level of reception of the wireless signal is indicated. Specifically, the quality level of reception is directly proportional to the error rate of the digital data portion of the signal.

30 Claims, 6 Drawing Sheets

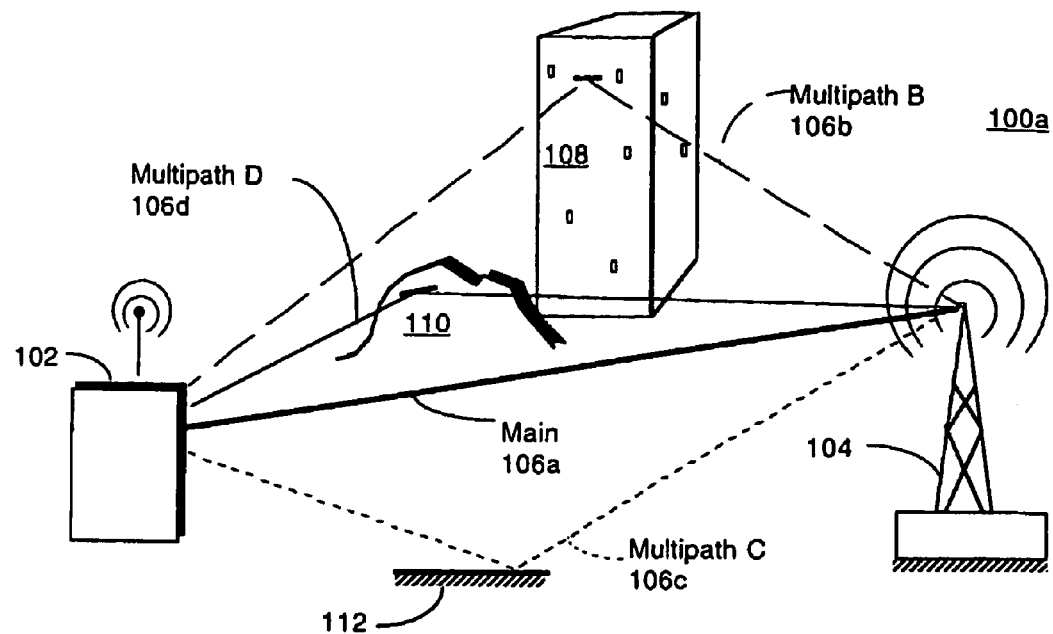
Prior Art Fig. 1A
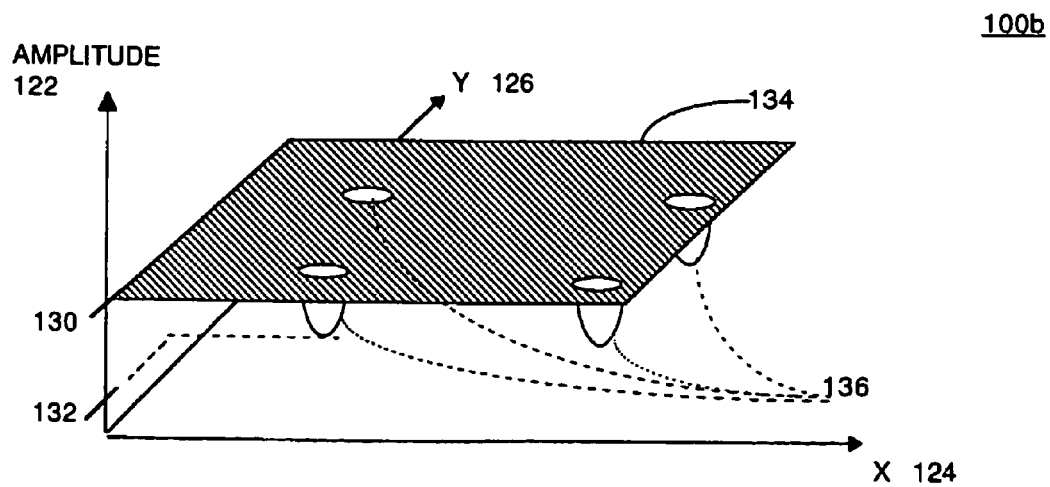
Prior Art Fig. 1B

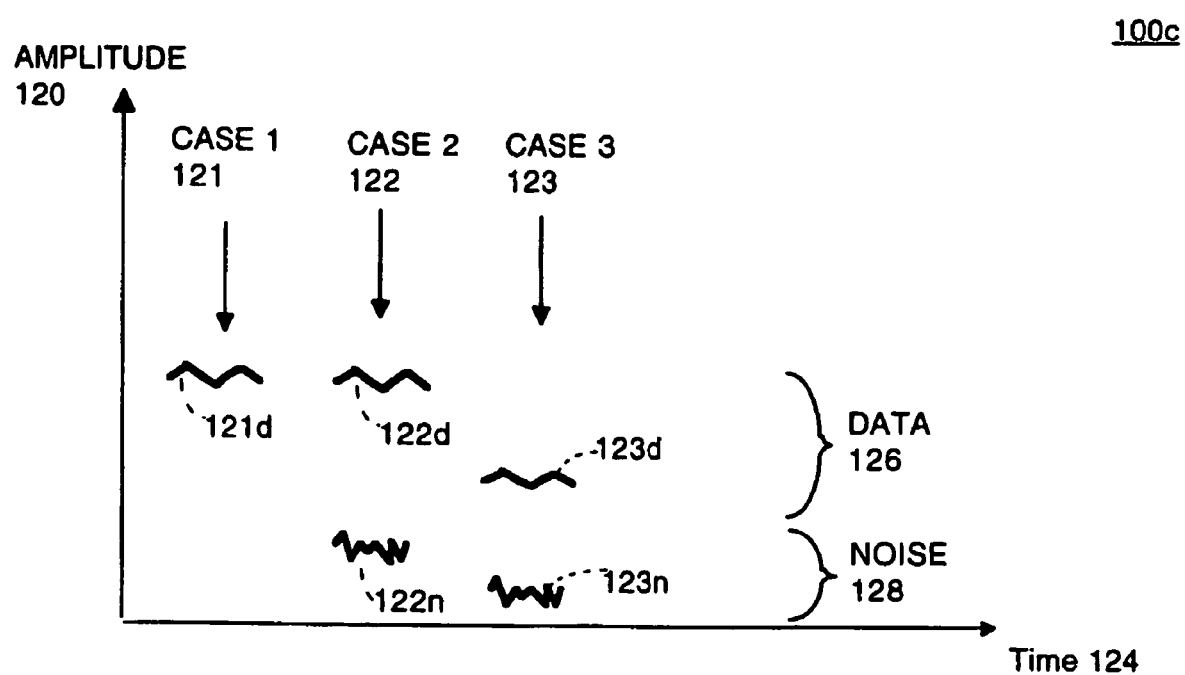
Prior Art Fig. 1C

US 7,133,446 B1

PERFORMANCE INDICATOR FOR WIRELESS DIGITAL SIGNAL RECEPTION

TECHNICAL FIELD

The present claimed invention relates to the field of wireless communication of digital data. Specifically, the present claimed invention relates to an indicator that displays the reception performance of a digital signal for a wireless receiver.

BACKGROUND ART

Wireless communication is growing increasingly popular in all areas of business and personal use. Technology areas that use wireless communication include telecommunication, networks, Internet, and audio and video media. Furthermore, much of the wireless data is presented in a digital format, which in itself provides opportunities for improved processing. Resultantly, a constant need exists to improve performance and fidelity of wireless communication systems.

Referring now to prior art FIG. 1A, an illustration of multipath signal propagation occurring in wireless communication is shown. More specifically, the wireless communication occurs between two devices, e.g., a station 104 and a portable device 102. Station 104 can be a base station for a cell phone, while portable device 102 can be a mobile phone. Alternatively, station 104 can be an audio/video broadcaster that transmits digitally encoded data that is received by a television or a personal computer (PC) 102. The wireless communication system and the devices can span a wide variety of media and applications.

The problem of multipath interference in wireless communication is illustrated in prior art FIG. 1A. A transmitted signal can follow multiple paths, or multipaths, to arrive at a receiver. For example, one signal path, e.g., main 106a, transmits directly to a receiver 102 without any interference. However, due to natural and man-made obstructions, such as building 108, hill 110, and surface 112, almost duplicate versions of the original signal arrive at receiver 102 with slight variations in phase, amplitude, and angle of arrival at receiver 102. These multipaths can cause interference and destructive interference between each other.

Referring now to prior art FIG. 1B, a graph of signal performance with a specific interference referred to as fading is shown. Graph 100b has a spatial X-Y plane defined by axis X 124 and axis Y 126. The vertical axis represents amplitude 122 of a signal that can be received at different spatial X, Y locations. Plane 134 defines an approximate amplitude of a transmitted signal in relation to the spatial location of a receiver, e.g., an antennae. Areas of plane 134 having an attenuated amplitude 136 is indicative of Rayleigh fading of the signal. Rayleigh fading is characterized by spatially repeating deep fading areas that severely effects wireless communication performance. If an antennae is positioned in one or more of these pockets 136 of Rayleigh fading, then reception quality of a wireless signal can be significantly compromised. Multipath fading occurs when a receiver receives not only the direct signal from a transmitter, but also reflected signals that differ from the direct signal in amplitude, phase, and/or angle of arrival, e.g., multipath B 106b, multipath C 106c, and multipath D 106d of prior art FIG. 1A.

Multipath fading is directly related to the environment in which the receiver is working. For example, the Institute of Electrical and Electronic Engineers (IEEE) standard 802.11 for wireless local area network (LAN) employs frequencies of 2.4 gigahertz (GHz). However, at this frequency moving human bodies affect the multipath fading, sometimes to a greater extent than building construction. In fact, much research has shown that at 2.4 GHz, Rayleigh type fading occurs. Consequently, a need arises to overcome the Rayleigh fading that degrades wireless communication performance. A more specific need arises to solve multipath fading in applications, such as wireless LANs, that have a high sensitivity to this performance degradation.

One method of avoiding these deep fading areas, is to use antenna diversity at a receiver. Antenna diversity simply uses two antennas that are spatially or polarity separated such that only one antenna would be in a deep fade area. The problem with this solution is that the user's receiver in typical IEEE 802.11 application is usually implemented on a peripheral component (PC) card, which does not allow for a large enough antenna separation to substantially reduce the Rayleigh fading. Additionally, even if antennas with polarity diversity are used, they do not always provide adequate escape from Rayleigh fading. Consequently, a need arises for a method to avoid Rayleigh type fading when antennae diversity is ineffective or unsuitable.

Conventional methods have provided performance indicators, such as signal strength or SNR ratios, to indicate the reception quality of the radio. However, these methods and indicators are primarily for analog systems, and are not optimum for digital systems. Thus, their interpretation of good reception or a good signal is not necessarily applicable to that for a digital signal.

Referring now to prior art FIG. 1C, a graph of exemplary data and noise signals is shown. Graph 100c has an abscissa of time 124 and an ordinate of amplitude 120. Three cases of data/noise signal combinations are shown for illustrative purposes. Case 1 121 shows just a data signal 121d with no indication of noise amplitude. If a conventional performance indicator only provides the strength of a data signal, as shown in Case 1 121, then it can be misleading. While data signal may have acceptable amplitude, if a noise signal has sufficient amplitude, it may significantly corrupt the data signal. In contrast, Case 2 122 shows a data signal amplitude 122d and a noise signal amplitude 122n. By using the conventional signal-to-noise (SNR) ratio, a relative strength of the data signal with respect to the noise signal can be obtained. However, as shown by case 3 123, signals with substantially different absolute amplitudes can appear to be equal (e.g., case 2 122 and case 3 123) based only on their ratio of signal to noise. Based on limitations of conventional indicators, they are unsuitable, in general, to evaluate the accuracy and reception quality of a digital signal. Consequently, a need arises for a performance indicator that is more applicable to digital data.

Furthermore, the solution that eliminates or alleviates Rayleigh type fading and provides indication of good digital signal quality should be intuitive and simple to use, so as to promote implementation and compatibility. That is, the solution should not require the user to have apriori radio, computer, or any other technical knowledge to operate or understand it. In addition, the solution to Rayleigh fading and the indicator digital signal performance should not require significant interaction of the hosting device such that system performance is hampered.

In summary, a need exists to improve performance and fidelity of wireless communication. A need also arises to overcome the Rayleigh fading that degrades wireless communication performance. A more specific need arises to solve multipath fading in applications, such as wireless LANs, that have a high sensitivity to this performance degradation. Another need arises for a method to avoid Rayleigh type fading when antennae diversity is ineffective or unsuitable. Based on the limitations of conventional indicators, a need arises for a performance indicator that is more applicable to digital data. Furthermore, the solution that eliminates or alleviates Rayleigh type fading and provides indication of good digital signal quality should be intuitive and simple so as to promote implementation and compatibility. That is, the solution should not require the user to have apriori radio, computer, or any other technical knowledge to operate or understand it. In addition, the solution to Rayleigh fading and the indicator of digital signal performance should not excessively burden the hosting device such that system performance is hampered.

SUMMARY OF THE INVENTION

The present invention provides a performance indicator for wireless digital signal reception, thereby improving performance and fidelity of wireless communication systems. The present invention also provides a method of overcoming the Rayleigh fading that otherwise degrades wireless communication performance. The present invention is effective for sensitive applications such as wireless LANs, or in cases where antennae diversity alone is ineffective or unsuitable. The present invention provides a performance indicator that is more applicable to digital data, and is intuitive and simple to use, thereby promoting implementation and compatibility with existing systems. That is, the solution does not require the user to have apriori radio, computer, or any other technical knowledge to operate or understand it. In addition, the present invention does not require interaction of the hosting device. In this manner, the indicator does not hamper system performance.

In one embodiment, the present invention recites a method for indicating the reception quality of a wireless digital signal in an electronic device. The method includes a series of steps, starting with a first step of receiving the wireless digital signal at the electronic device. In the next step, the wireless signal is demodulated. Then, an error rate associated with the digital data portion of the wireless signal is determined. The error rate of the packet of digital data can be determined by any rate, such as a cyclic redundancy code (CRC) algorithm, or a forward error correction (FEC) algorithm. In the next step, a quality level of reception of the wireless signal is indicated. Specifically, the quality level of reception is directly proportional to the error rate of the signal. Thus, for example, the present embodiment provides an LED with a low flashing rate for a receiver with poor reception, e.g., a high error rate, of a wireless digital signal. Alternatively, the present embodiment provides an LED with a high flashing rate for a receiver with good reception, e.g., a low error rate, of a wireless digital signal. The reception quality indicator can provide valuable information to a user, or provide feedback to a controllable reception variable, thereby promoting accurate placement of an antennae and/or transceiver for the best quality of reception.

In another embodiment, the present invention recites a communication device including an antennae, a transceiver, an indicator, a processor, and a computer readable memory, all coupled to each other. The memory portion of the communication device contains data and program instructions that, when executed via the processor, implement the aforementioned method for providing a reception quality indicator for a wireless digital signal.

These and other objects and advantages of the present invention will become apparent to those of ordinary skill in the art after having read the following detailed description of the preferred embodiments which are illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART FIG. 1A is an illustration of multipath signal propagation for a wireless communication system.

PRIOR ART FIG. 1B is a graph of signal performance with Rayleigh fading effects.

PRIOR ART FIG. 1C is a graph of conventional exemplary data and noise signals.

BEST MODE FOR CARRYING OUT THE INVENTION

Figure 2A:
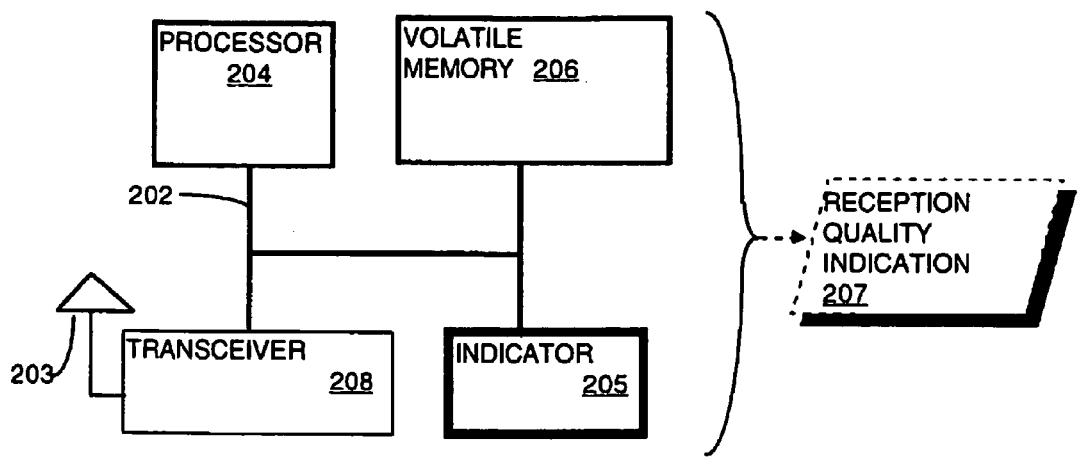
FIG. 2A is a hardware block diagram of a wireless device for indicating reception quality of a digital signal, in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail, so as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "demodulating," "determining," "indicating," "updating," "recording," "identifying," "providing," "adjusting," or the like, refer to the action and processes of a communication device or a similar electronic computing device, that manipulates and transforms data. The data is represented as physical (electronic) quantities within the communication device components, and is transformed into other data similarly represented as physical quantities within the communication device components, or other such information storage, transmission or display devices.

Referring now to FIG. 2A, a hardware block diagram of a wireless device for indicating reception quality of a digital signal is shown, in accordance with one aspect of the present invention. In the present embodiment communication device 200a is a radio frequency (RF) peripheral component (PC) card, capable of being installed in an expansion slot of a personal computer (PC). Communication device 200a is configurable to determine the reception performance of a wireless digital signal, in the present embodiment. Electronic device 200a provides a reception quality indication output 207. This output can be utilized by a user or an electronic system to evaluate and improve the reception quality of the electronic device.

Communication device 200a can be a wide range of devices, including stand-alone or integrated devices, that are incorporated into a wide range of applications. For example, communication device 200a can be any type of PC card or integrated component that is used in a standalone PC, a network device, a server, a printer, etc. In brief, communication device 200a can be any electronic device that receives a digital wireless signal. Furthermore, communication device 200a can be incorporated into a personal communication device such as a cell phone, a personal digital assistant (PDA) with wireless communication capabilities, or entertainment media such as a television, a satellite dish, etc. By incorporating an indicator 205, with the appropriate instructions in memory 206 executed via processor 204, the present invention provides a more appropriate indicator of receiver performance for a wireless digital signal.

Communication device 200a includes a processor 204, memory 206, transceiver 208, indicator 205 and antennae 203. Antennae 203 is coupled to transceiver 208. Transceiver 208 is coupled to processor 204, volatile memory 206, indicator 205, and non-volatile memory 208 via bus 202. Bus 202 provides data and control lines for the transmission of data and commands between the interconnected components. Memory 206 can include either volatile memory and/or non-volatile memory. Basic Input/Output system instructions can be stored in non-volatile memory portion of memory 206 for operating communication device 200a. Similarly, software or firmware code for determining the reception performance of a wireless digital signal can be stored in volatile memory or in non-volatile memory, respectively, portions of memory 206. If code is stored on volatile memory portion of memory 206, then it must be loaded from either non-volatile memory, or from a data storage device, such as a system hard drive or floppy drive, not shown in the present embodiment. The instructions stored as firmware or software code are executed using the processor in harmony with other components shown in FIG. 2A. While the present embodiment uses a transceiver, 204 to receive signals from antennae 203, the present invention is well-suited to using a receiver to receive the signals.

Indicator 205 of FIG. 2A is a light emitting diode (LED) in the present embodiment that provides an indication of reception performance of a digital wireless signal. However, indicator 205 can be any combination of audio or visual elements that convey a message corresponding to the reception performance of a digital wireless signal by the communication device, e.g., specifically at the antennae and transceiver. Specific configurations of indicator 205 and correlation to reception performance of wireless digital signals is described hereinafter in the flowchart figures for the process.

Figure 2B:
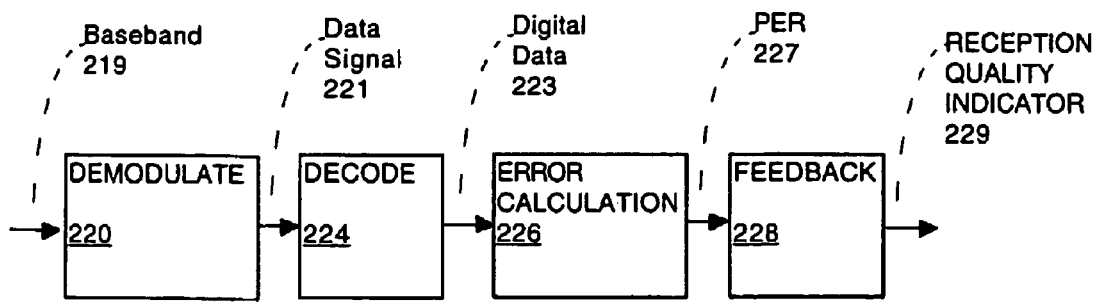
FIG. 2B is a block diagram of the functions performed, and the data transfer provided, by a wireless device indicating reception quality of a digital signal, in accordance with one embodiment of the present invention.

Referring now to FIG. 2B, a block diagram of the functions performed, and the data transfer provided, by a wireless device indicating reception quality of a digital signal is shown, in accordance with one embodiment of the present invention. The function blocks can be implemented using one or more of the components of wireless device such as 200a of FIG. 2A. Block diagram 200b begins with the input of a baseband signal 219 provided to demodulate block 220. Demodulate block 220 outputs a data signal 221 to decode block 224 which outputs a digital data 223, e.g. via an analog to digital (A to D) converter, and/or encryption decoder. Error calculation block 226 evaluates digital data signal 223 and provides an error rate 227, such as packet error rate (PER), associated with the data signal. Finally, feedback block 228 receives the PER data 227 and provides a reception quality 229 as output. This flow of data and functions provides an indication of reception quality such that the reception can be improved, thereby increasing productivity of wireless communication.

Figure 3A:
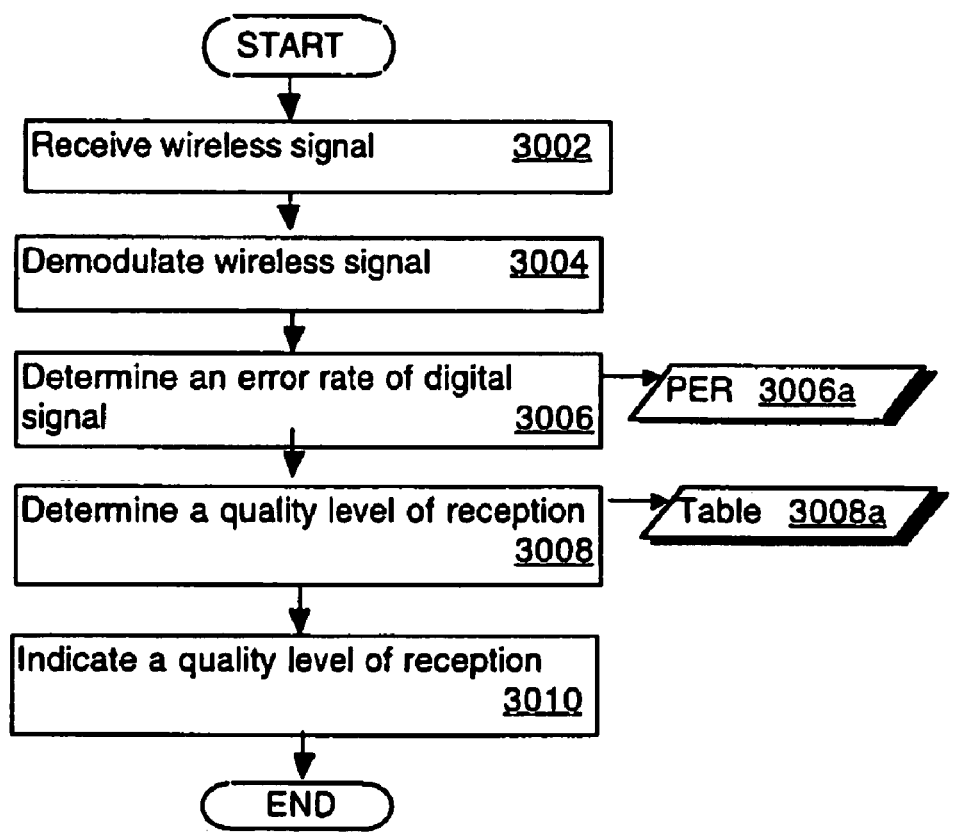
FIG. 3A is a flow chart of the steps performed to indicate reception quality of digital signal on a wireless device, in accordance with one embodiment of the present invention.

Referring now to FIG. 3A, a flowchart embodiment of a process for indicating the reception quality of digital signal on a wireless device is shown, in accordance with one embodiment of the present invention. The steps of flowchart 3000a can be implemented in one embodiment by the various components of communication device 200a of FIG. 2A. In particular, the queries and the logic of process 3000a can be implemented using a state machine or by using firmware/software, stored in memory 206, executed via processor 204 to control other components of communication device 200a. By implementing the flowchart 3000a embodiment of the present invention, the quality of digital signal on a wireless device, the overall quality, fidelity, and performance of the communication system is enhanced by indicating the digital wireless signal reception.

Process 3000a begins with step 3002. In step 3002 of the present embodiment, a wireless signal is received. Step 3002 is implemented, in one embodiment, by antennae 203 shown in FIG. 2. Antennae 203 picks up the wireless signal, e.g., a main signal and/or its multipath versions. Following step 3002, process 3000a proceeds to step 3004.

In step 3004 of the present embodiment, the wireless signal is demodulated. Step 3004 is accomplished, in one embodiment, by transceiver 208 shown in FIG. 2. A receiver can be utilized for step 3004 in lieu of a transceiver. Step 3004 can also include a substep, not shown in FIG. 3A, of converting an analog signal received by antennae 203 to a digital signal (e.g., a "A to D" conversion) that is well-known in the art. Step 3004 essentially obtains the data signal from the baseband signal and converts it to a digital format that is appropriate for subsequent digital signal processing (DSP). The demodulation step is well-known by those skilled in the art. The present invention is also well-suited to a signal that is multiplexed with other signals. For example, signal transmission such as time-division multiplexing (TDM), code division multiple access (CDMA), frequency division multiplexing (FDM), and other forms of multiplexing are well-suited to implementation by the present invention. Following step 3004, process 3000a proceeds to step 3006.

In step 3006 of the present embodiment, an error rate is determined. Step 3006 is accomplished, in one embodiment, by a packet error rate (PER) calculation. However, the present invention is well-suited to using other error-checking methods or algorithms for determining the accuracy of the digital data received by the electronic device. The PER of the present embodiment can be determined by a wide variety of methods. For example, the PER can be determined by methods such as the cyclic redundancy code (CRC) or a Forward error correction (FEC) algorithm.

The CRC method checks a parity bit to determine if a data packet of a received digital signal has an error or not. This method is a qualitative measurement capable only of a binary outcome, either the packet has no errors and therefore is acceptable, or it has at least one error, and is therefore unacceptable. In contrast, the FEC algorithm can determine the amount of correction required to a data packet. One example of a FEC algorithm is the Reed-Solomon method. An FEC algorithm provides a quantitative indication of the amount of errors in a given data packet. Either of these two methods can provide error information to the following steps for evaluation. Following step 3006, process 3000a proceeds to step 3008.

In step 3008 of the present embodiment, a quality level of reception is determined. Step 3008 is accomplished, in one embodiment, using a software algorithm, implemented by electronic device 200a of FIG. 2A. That is, step 3008 associates a quality level with a given error rate. Step 3008 can be implemented using software memory executed by a processor such as a look up table or an algorithm. Alternatively, step 3008 can be implemented using hardware such as logic gates.

The present invention is well-suited to using any relationship between a quality level and an error rate. For example, a linear or nonlinear relationship can be established between the error rates and the quality levels. The variables associated with the error rate can be significant. For example, the 'number of errors' in a data packet can be an indication of reception quality. Also, the 'frequency' of packets that have the number of errors can be an indication of the reception quality.

In one embodiment of step 3008, a non-linear relationship is used for a receiver using a non-error correcting algorithm for decoding the digital signal. This is because as the error rate increases even slightly from a zero-error level, the entire data packet typically becomes useless. That is, in a non-error-correcting algorithm, any error in the reception of a data packet implicitly requires the retransmission of the data, a resource-intensive process. Consequently, in this scenario, the frequency of data packets having any quantity of errors of all becomes very critical. Evaluating this embodiment with the scenarios of Table 1, shown hereinafter, results in the following Pareto sequence of desirable reception: scenario 1 provides the best reception because it has no errors in any data packets; scenario 3 provides the second best reception because it has some error in only one of the data packets, scenario 2 provides the third best reception because it has some error in two of the data packets; scenario 4 and 5 equivalently provide the worst reception because, regardless of the amount of error rate, all data packets have at least some errors, and are therefore unacceptable.

In another embodiment of step 3008, an error-correcting algorithm is used in the electronic device receiving and decoding the digital signal. In this embodiment, errors can be identified and compensated for in the electronic device receiving the digital signal. However, the quantity of errors as well as the frequency of the data packets having the errors now becomes significant because they will consume system resources to correct the errors. Thus, this embodiment can utilize a linear relationship because errors in a packet can be corrected, with each additional error consuming additional system resources to correct. At some point, a sufficient quantity of errors may dictate the retransmission of the data packet, thereby justifying a non-linear relationship between the quantity of errors and the quality level of the reception. However, many different strategies can be accommodated by the present invention. Evaluating this embodiment with the scenarios of Table 1, shown hereinafter, results in the following Pareto sequence of desirable reception: scenario 1 is best because it has no errors in any data packets; scenario 2 is second because it has only 5% PER in each of two data packets, scenario 3 is third because it has 55% PER in one data packet; scenario 4 is fourth because it has 55%, 5% and 5% PER for the three respective data packets; scenario 5 is last because it has high error rates in all packets. Thus, the present embodiment is sensitive to the cumulative errors in data packets. In lieu of simple strength indications of a signal, more appropriate for an analog signal, the present invention appropriately indicates the quality of the digital data. Following step 3008, process 3000a proceeds to step 3010.

TABLE 1

Error Rate Scenarios

| Scenario | ERROR Rate in Packets (PER) | | | Reception QUALITY | |
| --- | --- | --- | --- | --- | --- |
| | Data Packet 1 | Data Packet 2 | Data Packet 3 | NON-Error Correcting | Error Correcting |
| 1. No Error - All Packets | 0 | 0 | 0 | Best | Best |
| 2. Low Error - Some Packets | 5% | 0 | 5% | Medium | Good |
| 3. Hi Error - Some Packets | 55% | 0 | 0 | Medium | Medium |
| 4. Low Error - All Packets | 55% | 5% | 5% | Worst | Medium |
| 5. Hi Error - All Packets | 80% | 75% | 85% | Worst | Worst |

In step 3010 of the present embodiment, the quality level of reception is indicated. Step 3010 is accomplished, in one embodiment, by providing a signal to a light emitting diode (LED) of indicator 205 of FIG. 2A. However, the quality level of reception can be indicated by any combination of audio, video, or other type of output. Furthermore the variation in the output can span a wide variety of embodiments. For example, the 'indication' of quality level can be tied to a variable quantity of illuminated LEDs. That is, more LEDs illuminate for a stronger wireless digital signal reception quality and less LEDs illuminate for a weaker signal quality. Alternatively, the rate at which an LED flashes can vary depending on the reception quality of the signal. For example, an LED can flash at a faster rate for a stronger reception quality, and flash at a slower rate for a weaker reception quality.

The following table, Table 2, provides a specific embodiment that implements step 3010. Table 2 provides incremental ranges of Packet Error Rate (PER) that a wireless receiver may yield for a digital signal it has received. For example, a first category is for a PER in the range of 0–10%, a second category is for a PER between 10–30%, etc. The rows across the top of the table represent different possible system data rates. Thus, the first scenario is for an 11 mega bits per second (Mbps) data rate, the second scenario is for a 5.5 Mbps data rate, and the final scenario is for a 2 Mbps data rate. However, this embodiment can be scaled for any data rate. The boxes below the processor rates, and across from the PER categories indicate the 'duty cycle' of an LED used to indicate the reception quality for a wireless digital signal. For example, if a wireless digital signal is received at 11 Mbps data rate at a PER of 5%, then the indicator LED would have a duty cycle of 20 ms 'on' followed by 5 ms 'off' (e.g., a fast flashing rate) to indicate the quality level of reception. However, if the PER for the same processor rose to 75%, then the indicator LED would have a duty cycle of 30 ms 'on' followed by a 200 ms 'off' (e.g., a slow flashing rate) to indicate the quality level of reception. Using the formula of the present embodiment, the LED would flash more frequently as the maximum reception quality was attained for the wireless digital signal. Similarly, the present embodiment would result in the LED flashing less frequently for a poor reception quality. Following step 3010, process 3000a ends.

TABLE 2

| Packet Error Rate (PER) [averaged over 500 ms] | Indication Rate | | | | | |
| --- | --- | --- | --- | --- | --- | --- |
| | 11 Mbps | | 5.5 Mbps | | 2 Mbps | |
| | On | Off | On | Off | On | Off |
| 00% < PER < 10% | 20 ms | 5 ms | 40 ms | 10 ms | 40 ms | 10 ms |
| 10% < PER < 30% | 20 ms | 20 ms | 40 ms | 30 ms | 40 ms | 30 ms |
| 30% < PER < 50% | 30 ms | 30 ms | 40 ms | 60 ms | 40 ms | 60 ms |
| 50% < PER < 70% | 30 ms | 50 ms | 40 ms | 100 ms | 40 ms | 100 ms |
| 70% < PER < 90% | 30 ms | 70 ms | 40 ms | 140 ms | 40 ms | 140 ms |
| 90% < PER < 100% | 30 ms | 200 ms | 40 ms | 400 ms | 40 ms | 400 ms |

Flowchart 3000a can be repeated indefinitely, thus providing a real-time indication of the quality level of reception of a communication device at all times. Alternatively, once a position has been obtained, the indicator output may no longer be necessary, and therefore may be discontinued.

Figure 3B:
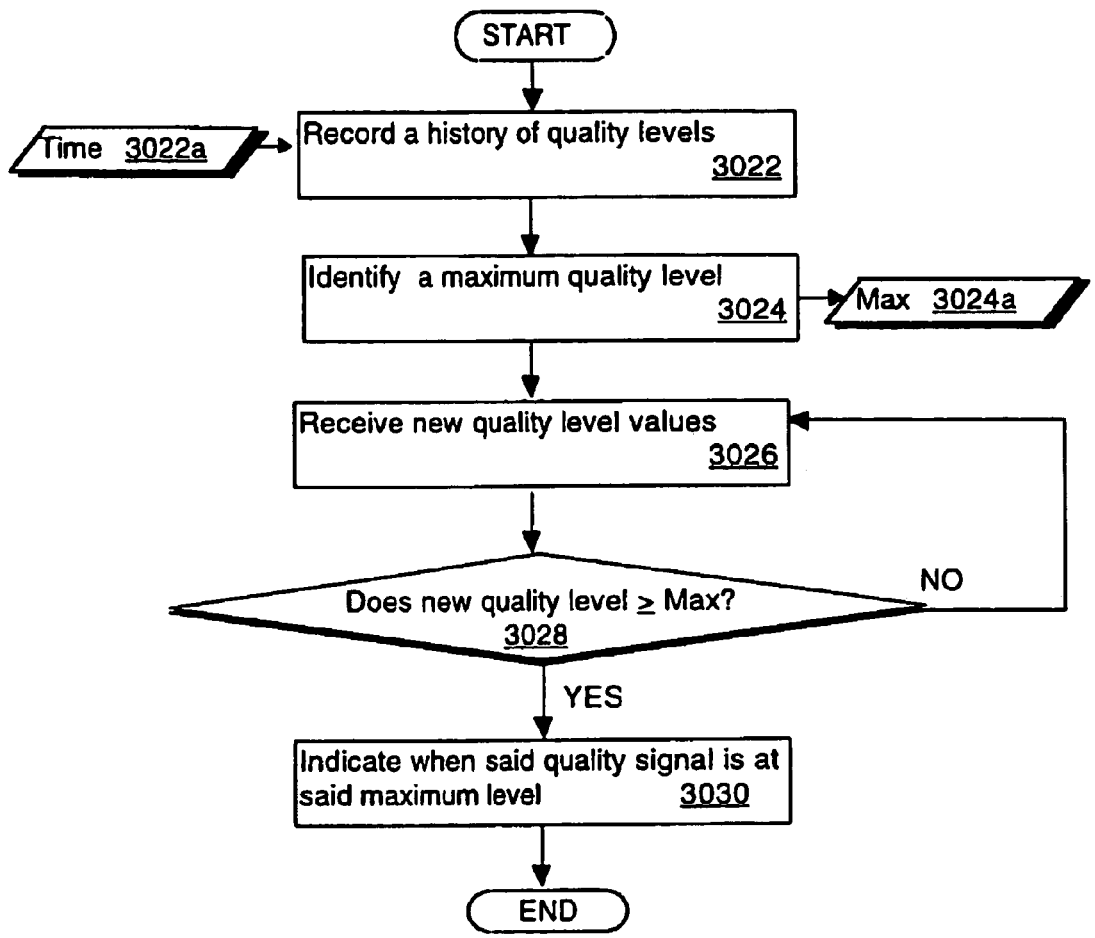
FIG. 3B is a flow chart of the steps performed to indicate a maximum reception quality of digital signal on a wireless device, in accordance with one embodiment of the present invention.

Referring now to FIG. 3B, a flowchart embodiment of a process to indicate maximum reception quality of digital signal on a wireless communication device is shown, in accordance with one embodiment of the present invention. The steps of flowchart 3000b can be implemented in one embodiment by the various components of communication device 200a of FIG. 2A. In particular, the queries and the logic of flowchart 3000b can be implemented using a state machine or by using firmware/software, stored in memory 206, and executed via processor 204 to control other components of communication device 200a. By implementing flowchart 3000b embodiment of the present invention, a 'maximum' reception quality for a digital wireless signal can be achieved quickly and accurately.

Process 3000b begins with step 3022. In step 3022 of the present embodiment, a history of quality levels is recorded. Step 3022 is implemented, in one embodiment, by iterating process 3000a using components of FIG. 2A over a period of time and recording the results in memory 206 of FIG. 2A. In one embodiment, an input of a time value 3022a, can provide a time limit over which the quality level of a signal is evaluated. For example, a time input of 15 seconds can be chosen in one embodiment, although the present invention is well-suited to using any quantity of time. During the timespan, an antennae's position can be rotated, translated, or moved in a wide variety of ways during the time period. By automatically detecting the maximum possible reception quality via the electronic device, a user is alleviated from a potentially intensive operation of both moving the antennae and trying to identify the position yielding the maximum reception quality. Following step 3022, process 3000*b* proceeds to step 3024.

In step 3024 of the present embodiment, a maximum quality level of reception is identified. Step 3024 is accomplished, in one embodiment, after expiration of a time limit, e.g., set by time input 3020*a*. Specifically, the processor can use a comparison algorithm to choose a baseline quality level and compare it to subsequent quality levels, repeatedly reestablishing the baseline with any quality level that exceeds it. In other words, steps 3022 and 3024 may only be able to identify the maximum reception quality level after all other quality levels have been identified as less than the maximum. Following step 3024, process 3000*b* proceeds to step 3026.

In step 3026 of the present embodiment, new quality levels are received. Step 3026 can be performed after the expiration of the time limit used to detect the maximum reception quality level. In step 3026, the antennae can be repositioned to try and duplicate the position that created the maximum quality reception level in step 3022–3024, with the electronic device providing an indication when the maximum quality reception level is matched. Following step 3026, process 3000*b* proceeds to step 3028.

In step 3028 of the present embodiment, an inquiry determines whether the new quality level is equal to, or greater than, the maximum value, e.g., the maximum level output 3022*a* from step 3024. If the new quality level is equal to or greater than the maximum value, then the flowchart 3000*b* proceeds to step 3030. However, if the new quality level does not exceed the maximum value, then process 3000*b* returns to step 3026. Step 3028 provides the logic for comparing and identifying the point at which the new quality level meet or exceeds the previously identified maximum quality level. Step 3028 is one of several possible embodiments for identifying the maximum quality level of reception for the present invention.

Step 3030 arises if the new quality level is equal to or greater than the maximum value, per step 3028. In step 3030 of the present embodiment, an indication is provided. Because step 3030 arises only when a new quality level is equal to or greater than the maximum quality level, the indication provided by step 3030 necessarily identifies the antennae orientation at which the maximum quality level is achieved. Foreseeable variations, e.g., hysteresis, in the quality level can occur between the searching phase of steps 3022–3024 and the positioning phase of steps 3026–3030. These variations may be accounted for using techniques known by those skilled in the art. Following step 3030, process 3000*b* ends.

Figure 3C:
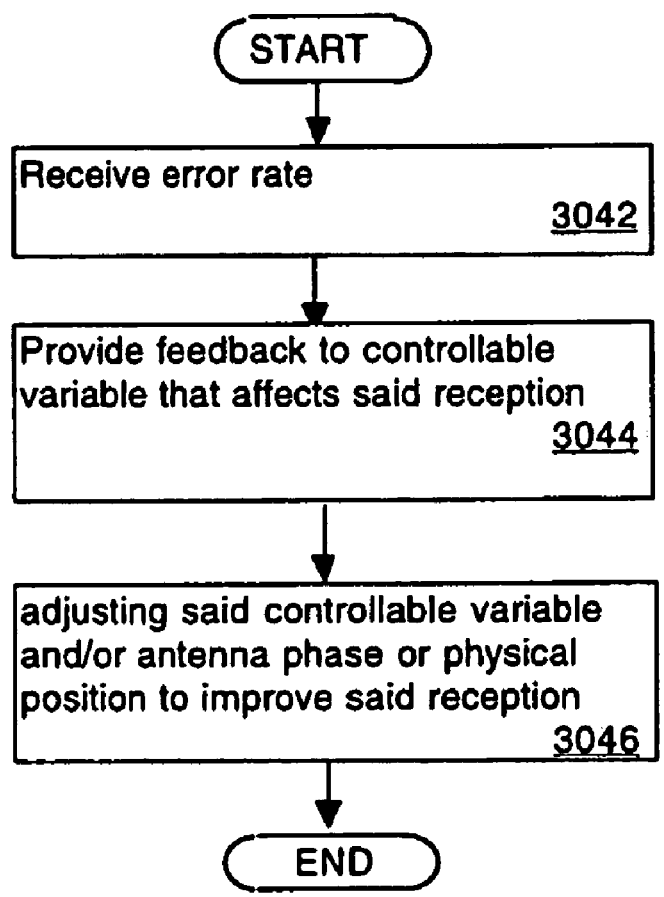
FIG. 3C is a flow chart of the steps performed for feedback control to a reception portion of a wireless device with respect to the reception quality, in accordance with one embodiment of the present invention.

Referring now to FIG. 3C, a flowchart embodiment of a process for providing feedback control to a reception portion of a wireless device with respect to the reception quality is shown, in accordance with one embodiment of the present invention. The steps of flowchart 3000*c* can be implemented in one embodiment by the various components of communication device 200*a* of FIG. 2A. In particular, the queries and the logic of flowchart 3000*c* can be implemented using a state machine or by using firmware/software, stored in memory 206, executed via processor 204 to control other components of communication device 200*a*. By implementing the flowchart 3000*c* embodiment of the process for indicating the reception quality of digital signal on a wireless device, the overall quality, fidelity, and performance of the communication system is enhanced.

Process 3000*c* begins with step 3042. In step 3042 of the present embodiment, an error rate is received. Step 3042 is implemented, in one embodiment, similar to the implementation of step 3006 of flowchart 3000*a*. In lieu of the error rate, the quality level of reception can be received. Following step 3042, process 3000*c* proceeds to step 3044.

In step 3044 of the present embodiment, feedback to a controllable variable that affects reception is provided. Step 3044 takes the error rate or the quality level provided by step 3042 and converts it to an electronic signal capable of manipulating other electronic components associated with the reception quality of a wireless digital signal. In other words, the error rate or quality level can be translated into a signal that affects the position of the antennae, the amplification of the signal, or other similar control variables that affect the reception of the signal. Step 3044 is accomplished, in one embodiment, using control system logic that is well known by those skilled in the art. Following step 3044, process 3000*c* proceeds to step 3046.

In step 3046 of the present embodiment, the controllable variable is adjusted to improve reception. Step 3046 receives the electronic signal from step 3044 and implements it to manipulate other electronic components antenna phase, antenna physical position or software associated with the reception quality of a wireless digital signal. In this manner, the present invention provides a reception system that automatically provides the highest reception quality level possible for the received digital signal. Following step 3046, process 3000*c* ends.

While process embodiments in flowcharts 3000*a*, 3000*b*, and 3000*c* use a specific sequence and quantity of steps, the present invention is suitable to alternative embodiments. For example, not all the steps provided for these processes are required for the present invention. Furthermore, additional steps can be added to the steps presented in the present embodiment. Likewise, the sequence of the steps can be modified depending upon the application. While these processes is shown as a single serial process, it can also be implemented as a continuous or parallel process.

Many of the instructions for the steps, and the data input and output from the steps of process embodiments in flowcharts 3000*a*, 3000*b*, and 3000*c* is implemented utilizing memory 206 and utilizing processor 204, as shown in FIG. 2. Memory storage 206 of the present embodiment can include both permanent memory, such as read only memory (ROM), and temporary memory such as random access memory (RAM). ROM memory can be utilized to store data for permanent functions of the dedicated service module, while RAM memory can be utilized to store data related to the on-site media service data. Memory 206 can include other types of memory storage, capable of containing data, such as a hard drive, a CD ROM, or flash memory. Furthermore, processor 204 can either be a dedicated controller, an existing system processor, or it can be a dedicated digital signal processing (DSP) processor. Alternatively, the instructions can be implemented using some form of a state machine.

In view of the embodiments presented herein, the present invention provides a performance indicator for wireless digital signal reception, thereby improving performance and fidelity of wireless communication systems. The present invention also provides a method of overcoming the Rayleigh fading that otherwise degrades wireless communication performance. The present invention is effective for sensitive applications such as wireless LANs, or in cases where antennae diversity alone is ineffective or unsuitable. The present invention provides a performance indicator that is more applicable to digital data, and is intuitive and simple to use, thereby promoting implementation and compatibility with existing systems. That is, the solution does not require the user to have apriori radio, computer, or any other technical knowledge to operate or understand it. In addition, the present invention does not require interaction of the hosting device. In this manner, the indicator does not hamper system performance.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method of indicating reception performance of a wireless signal at a radio frequency peripheral component card of a computer system, said method comprising:
   receiving said wireless signal at a wireless receiver of said radio frequency peripheral component card;
   demodulating said wireless signal;
   determining an error rate of a digital data portion of said wireless signal; and
   indicating a quality level of reception of said wireless signal at said radio frequency peripheral component card based on said error rate using an indicator component of said radio frequency peripheral component card.

2. The method recited in claim 1 wherein said quality level of reception is indicated by a light emitting device.

3. The method recited in claim 1 further comprising:
   linearly translating said error rate into said quality level.

4. The method recited in claim 1 wherein said error rate is a packet error rate.

5. The method recited in claim 4 wherein said packet error rate is determined by a cyclic redundancy code (CRC) algorithm.

6. The method recited in claim 4 wherein said packet error rate is determined by a forward error correction (FEC) algorithm.

7. The method recited in claim 1 wherein said quality level is linearly proportional to said error rate of said wireless signal.

8. The method recited in claim 1 further comprising:
   adaptively updating said determining said error rate and said indicating said quality level.

9. The method recited in claim 1 further comprising:
   recording a history of said quality level with respect to another variable;
   identifying a maximum quality level; and
   indicating when said quality level is at said maximum level.

10. The method recited in claim 1 further comprising:
    providing feedback to control reception, said feedback related to said quality level of reception; and
    adjusting said reception based on said feedback, thereby improving said quality level of said reception.

11. A radio frequency peripheral component card of a computer system for receiving a wireless signal, said radio frequency peripheral component card comprising:
    a receiver;
    an indicator coupled to said receiver;
    a processor, said processor coupled to said receiver; and
    a computer readable memory unit, said computer readable memory unit coupled to said processor, said computer readable memory unit containing program instructions stored therein that cause the processor to determine an error rate of a digital data portion of a received and demodulated wireless signal and to indicate with said indicator a quality level of reception of said wireless signal at said radio frequency peripheral component card based on said error rate.

12. The radio frequency peripheral component card recited in claim 11 wherein said quality level of reception is indicated via a light emitting device.

13. The radio frequency peripheral component card recited in claim 11 wherein said quality level is a linear translation of said error rate.

14. The radio frequency peripheral component card recited in claim 11 wherein said error rate is a packet error rate.

15. The radio frequency peripheral component card recited in claim 14 wherein said packet error rate is determined by a cyclic redundancy code (CRC) algorithm.

16. The radio frequency peripheral component card recited in claim 14 wherein said packet error rate is determined by a forward error correction (FEC) algorithm.

17. The radio frequency peripheral component card recited in claim 11 wherein said quality level is linearly proportional to said error rate of said wireless signal.

18. The radio frequency peripheral component card recited in claim 11 herein said program instruction further cause the processor to update, adaptively, said error rate and said quality level.

19. The radio frequency peripheral component card recited in claim 11 wherein said program instruction further cause the processor to record a history of said quality level with respect to another variable, identify a maximum quality level, and indicate when said quality level is at said maximum level.

20. The radio frequency peripheral component card recited in claim 11 wherein said program instruction further cause the processor to provide feedback to control reception, said feedback related to said quality level of reception.

21. A computer readable medium containing therein computer readable codes for causing a radio frequency peripheral component card of a computer system to implement a method of managing multipath signals, said method comprising:
    receiving a wireless signal at a wireless receiver of said radio frequency peripheral component card;
    demodulating said wireless signal;
    determining an error rate of a digital data portion of said wireless signal; and
    indicating a quality level of reception of said wireless signal at said radio frequency peripheral component card based on said error rate using and indicator component of said radio frequency peripheral component card.

22. The computer readable medium recited in claim 21 wherein said quality level of reception is indicated via a light emitting device.

23. The computer readable medium recited in claim 21 wherein said method further comprises:

linearly translating said error rate into said quality level.

24. The computer readable medium recited in claim 21 wherein said error rate is a packet error rate.

25. The computer readable medium recited in claim 24 wherein said packet error rate is determined by a cyclic redundancy code (CRC) algorithm.

26. The computer readable medium recited in claim 21 wherein said packet error rate is determined by a forward error correction (F'EC) algorithm.

27. The computer readable medium recited in claim 21 wherein said quality level is linearly proportional to said error rate of said wireless signal.

28. The computer readable medium recited in claim 21 wherein said method further comprises:

adaptively updating said determining said error rate and said indicating said quality level.

29. The computer readable medium recited in claim 21 wherein said method further comprises:

recording a history of said quality level with respect to another variable;

identifying a maximum quality level; and indicating when said quality level is at said maximum level.

30. The computer readable medium recited in claim 21 wherein said method further comprises:

providing feedback to control reception, said feedback related to said quality level of reception; and adjusting said reception based on said feedback, thereby improving said quality level of said reception.

* * * * *